(12) United States Patent
Meriö

(10) Patent No.: US 11,455,271 B2
(45) Date of Patent: Sep. 27, 2022

(54) INTER-PROCESSOR COMMUNICATION

(71) Applicant: Nordic Semiconductor ASA, Trondheim (NO)

(72) Inventor: Ville Meriö, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 217 days.

(21) Appl. No.: 16/956,105

(22) PCT Filed: Dec. 20, 2018

(86) PCT No.: PCT/EP2018/086417
§ 371 (c)(1),
(2) Date: Jun. 19, 2020

(87) PCT Pub. No.: WO2019/122251
PCT Pub. Date: Jun. 27, 2019

(65) Prior Publication Data
US 2021/0089491 A1   Mar. 25, 2021

(30) Foreign Application Priority Data
Dec. 22, 2017   (GB) ..................... 1721734

(51) Int. Cl.
*G06F 15/167*   (2006.01)
*G06F 1/3206*   (2019.01)
(Continued)

(52) U.S. Cl.
CPC .......... *G06F 15/167* (2013.01); *G06F 1/3206* (2013.01); *G06F 1/329* (2013.01);
(Continued)

(58) Field of Classification Search
CPC ...... G06F 15/167; G06F 1/3206; G06F 1/329; G06F 9/3877; G06F 9/544; G06F 1/3287; G06F 9/546; Y02D 10/00; Y02D 30/50
See application file for complete search history.

(56) References Cited

U.S. PATENT DOCUMENTS

| 2004/0107264 | A1  | 6/2004  | Nishida |
|---|---|---|---|
| 2006/0242257 | A1* | 10/2006 | Kuribayashi ........... G06F 15/16 709/214 |
| 2013/0086286 | A1* | 4/2013  | Tsadik .................... G06F 9/544 710/53 |

FOREIGN PATENT DOCUMENTS

EP   2 869 206 A1   5/2015

OTHER PUBLICATIONS

IPO Search Report under Section 17(5) for GB 1721734.0, dated Jun. 15, 2018, 3 pages.
(Continued)

*Primary Examiner* — Michael A Keller
(74) *Attorney, Agent, or Firm* — Klarquist Sparkman, LLP

(57) ABSTRACT

An electronic device comprises a first processor and a second processor. An inter-processor communication module is connected to the processors and comprises a high priority mailbox and a low priority mailbox. The first processor sends a high or low priority message to the second processor. The first processor is arranged such that if it has a high priority message to send to the second processor, the first processor places the high priority message in the high priority mailbox and sends an interrupt request to the second processor. However, when the first processor has a low priority message to send to the second processor, the first processor places the high priority message in the low
(Continued)

priority mailbox to be checked later without sending an interrupt request to the second processor.

16 Claims, 4 Drawing Sheets

(51) Int. Cl.
*G06F 9/38* (2018.01)
*G06F 9/54* (2006.01)
*G06F 1/329* (2019.01)
*G06F 1/3287* (2019.01)

(52) U.S. Cl.
CPC ............ *G06F 9/3877* (2013.01); *G06F 9/544* (2013.01); *G06F 1/3287* (2013.01)

(56) References Cited

OTHER PUBLICATIONS

International Search Report and Written Opinion for PCT/EP2018/086417, dated Mar. 20, 2019, 14 pages.

\* cited by examiner

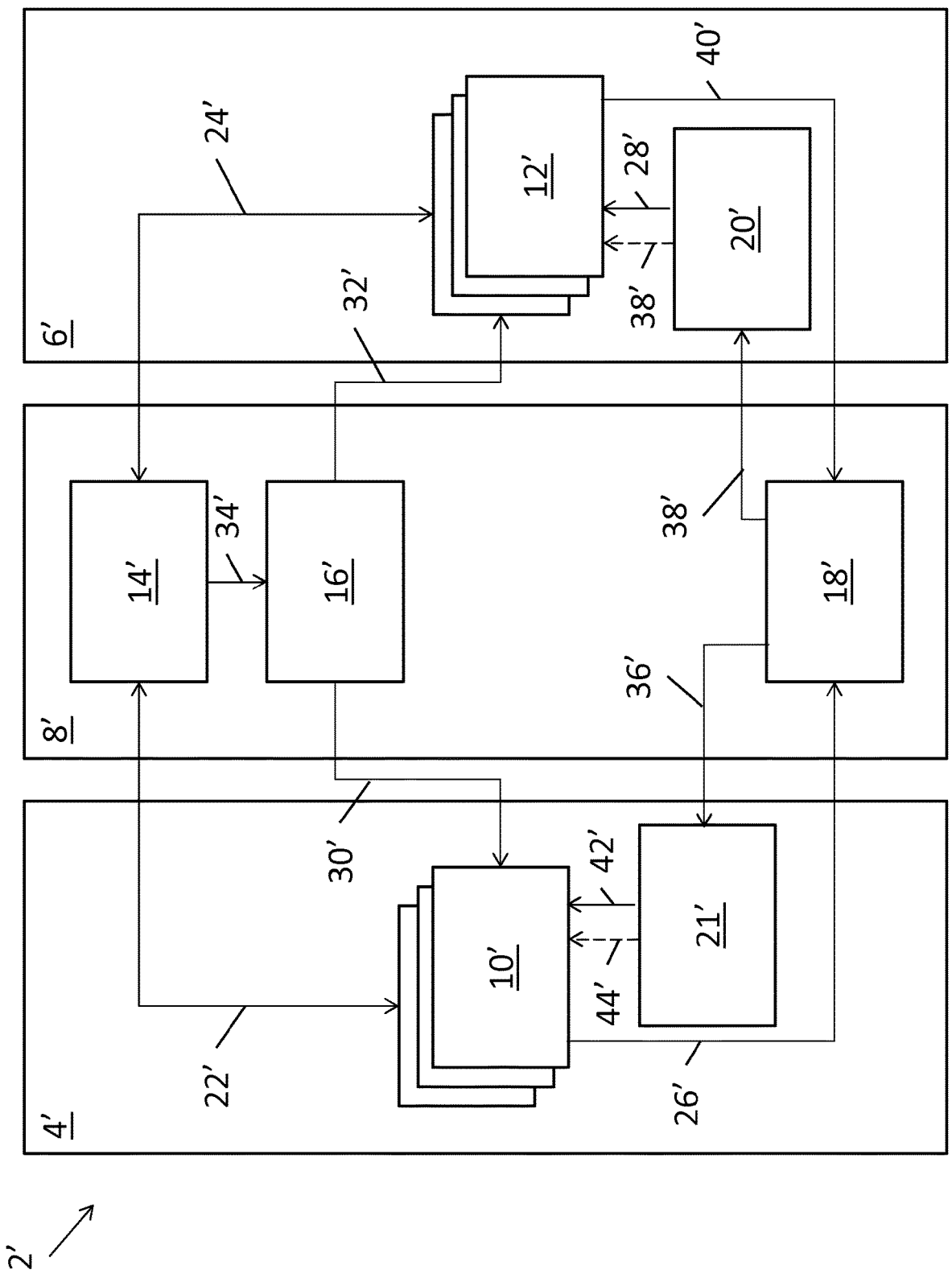

INTER-PROCESSOR COMMUNICATION

CROSS REFERENCE TO RELATED APPLICATIONS

This is the U.S. National Stage of International Application No. PCT/EP2018/086417, filed Dec. 20, 2018, which was published in English under PCT Article 21(2), which in turn claims the benefit of Great Britain Application No. 1721734.0, filed Dec. 22, 2017.

TECHNICAL FIELD

The present invention relates to communication between processors, in particular between two different central processing units that correspond with one another via a mailbox.

BACKGROUND

With a view to increasing the processing power of modern electronic devices, many such devices are provided with multiple processors or central processing units (CPUs). These may, for example, be separate discrete processors, or may be different processing 'cores' within a single chip. Such processors may work in parallel, for example to work on different processing tasks completely independent of one another. However, in some instances it is desirable for the processors to communicate with each other.

In order to facilitate such inter-processor communication (IPC), typically one CPU will write data to some location, a 'mailbox', that is shared between itself and the other CPU with which it wishes to communicate, and subsequently triggers an interrupt request (IRQ) to tell the other CPU that there is a message waiting in the mailbox. An IRQ is a hardware signal sent to the other CPU that requests that the other CPU temporarily ceases its current processing task and executes a particular task associated with the IRQ.

However, the Applicant has appreciated that conventional approaches are not efficient in terms of power consumption, particularly if the processor being interrupted is in a low power mode. In general, a CPU will not ignore an IRQ and so the CPU being interrupted will wake from its low power mode and restore its previous hardware state, which takes time and power. Furthermore, once the now-awake CPU has read the message after being interrupted, it will typically return to its low power mode, which also takes time and power.

SUMMARY OF THE INVENTION

When viewed from a first aspect, the present invention provides an electronic device comprising:
  at least first and second processors; and
  an inter-processor communication module connected to said first and second processors, said inter-processor communication module comprising a first mailbox and a second mailbox;
  wherein the first processor is arranged to send a message to the second processor, said message being either a high priority message or a low priority message;
  wherein the first processor is further arranged such that:
  when the first processor has a high priority message to send to the second processor, the first processor places the high priority message in the first mailbox and sends an interrupt request to the second processor; and
  when the first processor has a low priority message to send to the second processor, the first processor places the high priority message in the second mailbox and does not send an interrupt request to the second processor.

This first aspect of the invention extends to a method of operating an electronic device comprises at least first and second processors and an inter-processor communication module connected to said first and second processors, said inter-processor communication module comprising a first mailbox and a second mailbox, wherein the method comprises:
  determining when the first processor has a message to send to the second processor, wherein said message is a high priority message or a low priority message;
  when the first processor has a high priority message to send to the second processor, placing the high priority message in the first mailbox and sending an interrupt request to the second processor; and
  when the first processor has a low priority message to send to the second processor, placing the high priority message in the second mailbox and not sending an interrupt request to the second processor.

The first aspect of the invention further extends to a non-transitory computer-readable medium that, when executed on a first processor, causes the first processor to execute a method of communicating with a second processor, wherein the method comprises:
  determining when the first processor has a message to send to the second processor, wherein said message is a high priority message or a low priority message;
  when the first processor has a high priority message to send to the second processor, placing the high priority message in a first mailbox within an inter-processor communication module connected to said first and second processors, and sending an interrupt request to the second processor; and
  when the first processor has a low priority message to send to the second processor, placing the high priority message in a second mailbox within the inter-processor communication module, and not sending an interrupt request to the second processor.

Thus it will be appreciated by those skilled in the art that embodiments of the present invention provide an improved electronic device and method of operating the same where only high priority messages (e.g. those having a priority value exceeding a particular threshold) cause the second processor to be interrupted, while low priority messages are placed into a separate mailbox to the high priority messages and do not give rise to an interrupt. In order to accumulate the low priority messages until they are retrieved, the second mailbox may be implemented as a buffer.

While accumulating low priority messages for batch processing at a later time may increase the amount of memory needed to provide the inter-processor communication (e.g. to provide a buffer suitable for storing the low priority messages), doing so advantageously reduces the number of times the second processor needs to be interrupted, as the second processor may check the second mailbox at its convenience rather than being forced to do so for every incoming message from the first processor as with conventional approaches.

The second processor may check the second mailbox according to a predetermined schedule, however in some embodiments the first processor is arranged such that when it places a message in the second mailbox, it sets a low priority message waiting flag. In some such embodiments, the second processor checks whether the low priority message waiting flag is set, and retrieves the low priority message from the second mailbox only when the low priority message waiting flag is set. The second processor may then clear the low priority message waiting flag once it has retrieved the low priority message (or messages as outlined below) from the second mailbox.

This is particularly advantageous where the second processor is arranged to enter a low power or standby mode and thus, in some such embodiments, the second processor is operable in a normal mode of operation and a low power mode of operation in which one or more functions of the second processor are disabled, wherein the second processor is arranged to check whether the low priority message waiting flag is set or to check the low priority mailbox after switching from the low power mode to the normal mode. Those skilled in the art will appreciate that such embodiments provide a device wherein the second processor may remain in its low power mode until it needs to wake up (e.g. at a scheduled time or following a high priority interrupt) and processes the low priority message(s) waiting in the second, low priority mailbox.

In a set of such embodiments, the second processor is arranged to carry out one or more processing tasks before checking whether the low priority message waiting flag is set or checking the second mailbox when switching from the low power mode to the normal mode. In a set of embodiments, the second processor is arranged to check whether the low priority message waiting flag is set or simply to check the second (low priority) mailbox as part of an 'idle' operating system task.

The Applicant has appreciated that allowing low priority messages to accumulate until the second processor retrieves them is constrained by the finite memory provided to store such messages. In some embodiments, the inter-processor communication module is arranged to set a mailbox full flag when the number of messages contained in the second mailbox exceeds a threshold value, wherein setting the mailbox full flag sends an interrupt request to the second processor. While this threshold value could take any positive value greater than one (in order to prevent a low priority message having the same effect as a high priority message), in preferred embodiments, the threshold value is a maximum number of messages that the second mailbox can hold. This makes optimal use of the memory available for storing messages in the second mailbox, delaying waking up the second processor for as long as possible.

Instead of raising a mailbox full flag in the event of the number of messages contained in the second mailbox exceeding the threshold value, in some alternative embodiments a subsequent message is placed in the first (high priority) mailbox when the number of messages contained in the second mailbox exceeds a threshold value. The Applicant has appreciated that once the second, low priority mailbox is full, placing the next message sent by the first processor in the first mailbox, regardless of whether that message is a high priority or a low priority message, this will cause an interrupt of the second processor, such that the second processor can process some or all of the outstanding messages to free up space in the second mailbox.

The manner in which low priority messages are retrieved from the second mailbox may depend on the architecture of the device. In some embodiments, the second processor is arranged to call a receive function, wherein calling said receive function blocks a thread on the second processor until an idle thread generates a signal indicating that the low priority message should be delivered to the second processor. However, in an alternative set of embodiments, an idle thread is arranged to call a receive function, wherein the second mailbox is arranged to generate a signal that indicates to the idle thread that the low priority message should be delivered to the second processor. Thus, in some embodiments, the second processor retrieves the messages from the second mailbox directly, but in other embodiments the second processor retrieves the messages from the second mailbox via the idle thread.

The principles of the present invention apply equally regardless of whether the system is running an operating system or not.

While the communication between the processors may be arranged such that only the first processor can write to the mailboxes to send messages to the second process, in some embodiments the second processor is arranged to send a message to the first processor. The second processor could have write access only to the first mailbox in the conventional way, but preferably it also has write access to the second mailbox such that said message is either a high priority message or a low priority message;

wherein the second processor is further arranged such that:

when the second processor has a high priority message to send to the first processor, the second processor places the high priority message in the first mailbox and sends an interrupt request to the first processor; and when the second processor has a low priority message to send to the first processor, the second processor places the high priority message in the second mailbox and does not send an interrupt request to the first processor.

Thus in accordance with such embodiments, the first and second processors are provided with two-way communication such that each processor can send messages to the other. It will be appreciated that the optional technical features described above in relation to embodiments wherein the first processor sends messages and the second processor receives the messages also apply to embodiments wherein the first and second processors can both send and receive messages. Thus any feature described in relation to the first processor may also apply to the second processor and vice versa, both in addition or in the alternative.

In such embodiments, the first and second processors have access to the same mailboxes, i.e. the first and second mailboxes are each used for messages, regardless of which processor is sending and which processor is receiving. This can be suitable if the processors cannot send messages to one another at the same time, for example if a scheduler or arbitration module determines which processor can place messages in the mailboxes at any given time.

Alternatively, multiple message waiting flags may be used such that there is a separate message waiting flag to indicate that one or more messages await each respective processor and the messages may be provided with a destination address such that each processor can check its respective message waiting flag to determine whether any messages are waiting for said processor and, if so, said processor is arranged to retrieve the correct message by checking which of the messages are addressed to said processor.

In the above embodiments, the first and second processors may share the first and second mailboxes. However, in an alternative set of embodiments, the inter-processor communication module comprises a third mailbox and the second processor is further arranged such that when the second processor has a high priority message to send to the first processor, the second processor places the high priority message in the third mailbox and sends an interrupt request to the first processor. Thus the second processor may be provided with a separate mailbox for high priority messages that are destined for the first processor.

In a set of potentially overlapping embodiments, the inter-processor communication module comprises a fourth mailbox and the second processor is further arranged such that when the second processor has a low priority message to send to the first processor, the second processor places the high priority message in the fourth mailbox and does not send an interrupt request to the first processor. In accordance with such embodiments, the second processor may be provided with a separate mailbox for low priority messages that are destined for the first processor. It will be appreciated that the first and second processors may, in a particular set of embodiments, share a high priority mailbox (i.e. the 'first' mailbox) but have separate low priority mailboxes (i.e. the 'second' and 'fourth' mailboxes, where in such embodiments there is no 'third' mailbox). As any message written to a high priority mailbox (e.g. the 'first' or 'third' mailbox) may immediately cause an interrupt of the other processor, the risk of both processors writing to the same high priority mailbox at the same time is reduced.

In the embodiments described hereinabove there may only be a pair of processors arranged to communicate with one another, however in some embodiments the device comprises at least one further processor connected to the inter-processor communication module. It will be appreciated that the optional technical features described above in relation to the first and second processors may, in some embodiments, be readily applied to any such further processors individually or in any applicable combination such that the one or more further processors exchange messages (either by sending, receiving, or both) with all or a subset of the other processors. Similarly to the embodiments described in relation to two-way communication between the first and second processors, any such further processors may share mailboxes with one or more other processors (e.g. the first and second processors) or may be provided with one or more dedicated mailboxes for high and/or low priority messages.

BRIEF DESCRIPTION OF DRAWINGS

Certain embodiments of the invention will now be described, by way of example only, with reference to the accompanying drawings in which:

FIG. 2 is a block diagram of a device with two-way communication where the mailboxes are shared between the processors in accordance with another embodiment of the present invention;

DETAILED DESCRIPTION

Figure 1:
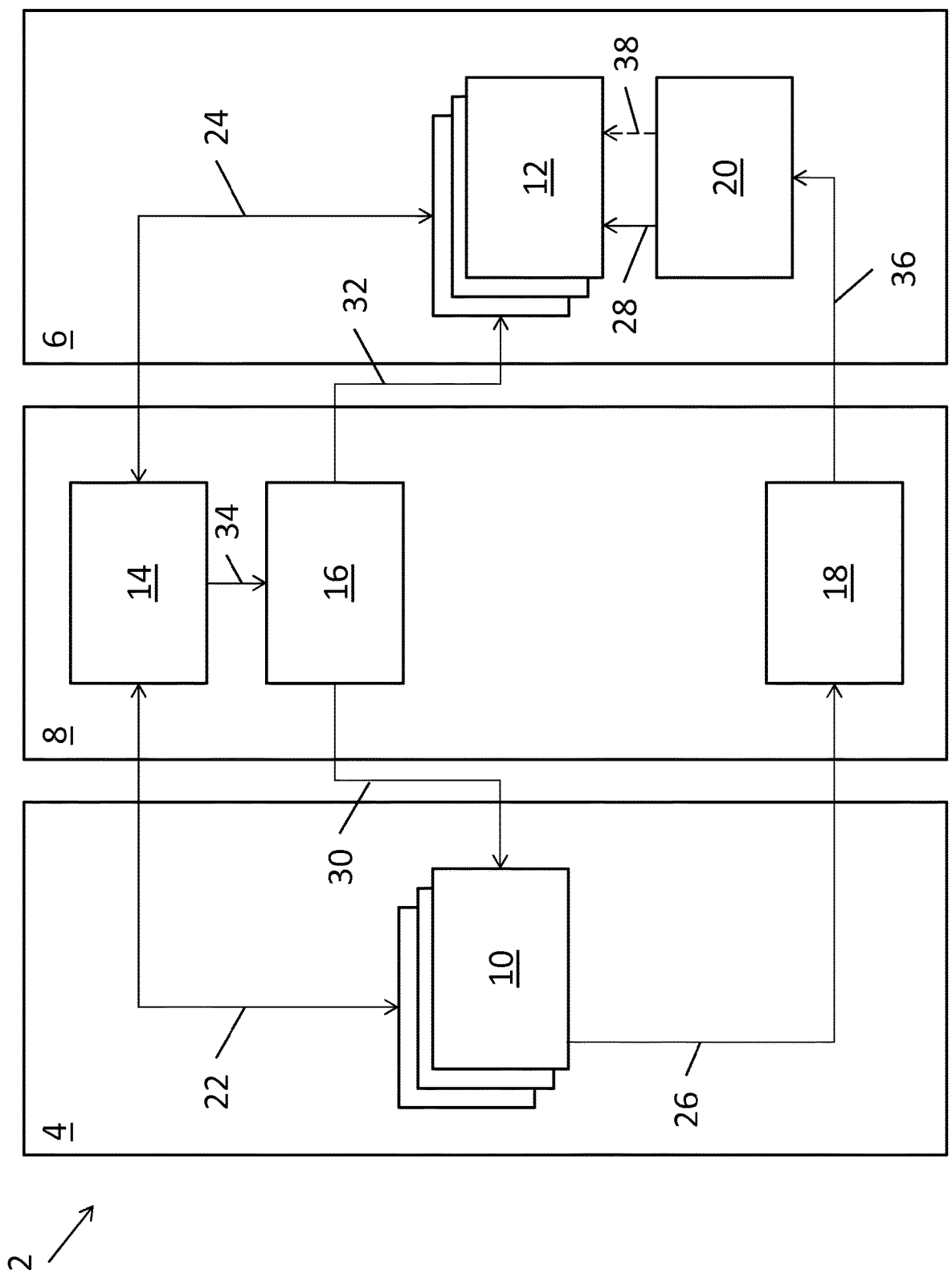
FIG. 1 is a block diagram of a device in accordance with an embodiment of the present invention.

FIG. 1 is a block diagram of a device 2 in accordance with an embodiment of the present invention. The device 2 comprises a first processor 4, a second processor 6, and an inter-processor communication (IPC) module 8, where the IPC module 8 is arranged between the two processors 4, 6.

The first processor 4 is arranged to run a first client application 10 and the second processor 6 is arranged to run a second client application 12, such that the first and second client applications 10, 12 run in parallel with one another. While the two client applications 10, 12 are independent, the processors 4, 6 can exchange data with one another when needed as described below.

The second processor 6 can be operated in either a normal mode of operation or a low power mode in which it reduces its power consumption, for example by switching off or by going to sleep for a period of time. The second processor 6 may be set to sleep and wake up according to a predetermined schedule, or the second processor 6 may instead be set to sleep indefinitely until woken up, for example by an interrupt.

The IPC module 8 comprises a high priority mailbox 14 that is connected to an IPC hardware module 16, and a low priority mailbox 18 that is connected to an idle thread 20 running on the second processor 6. The high priority mailbox 14 is connected to the first client application 10 via a bus 22 and to the second client application 12 via another bus 24. The low priority mailbox 18 is connected to the first client application 10 via a bus 26 and the idle thread 20 is connected to the second client application 12 via another bus 28. Each mailbox 14, 18 is implemented as a buffer in memory.

The buses 22, 24 that connect the high priority mailbox 14 to the client applications 10, 12 are two-way buses such that both applications 10, 12 can both send messages to and receive messages from the mailbox 14. However, the buses 26, 28 that connect the low priority mailbox 18 to the client applications 10, 12 are one-way buses such that only the first client application 10 can send messages to the low priority mailbox 18 while only the second client application 12 can receive messages from the low priority mailbox 18. Thus in this embodiment, the mailboxes 14, 18 are shared between the two processors 4, 6, but only the first processor 4 can write to the low priority mailbox 18. Embodiments having two-way exchange of low priority messages between the processors are described with reference to FIGS. 3 and 4.

The IPC hardware module 16 is connected to the first client application via a bus 30 and to the second client application via another bus 32. These buses 30, 32 are used to transmit an interrupt request (IRQ) to the respective processors 4, 6 following a high priority message being written to the high priority mailbox 14 by the other processor 4, 6 as described below.

When the first processor 4 has a message to send to the second processor 6, this may be a high priority message or a low priority message. If it is a high priority message, the first processor 4 writes the message to the high priority mailbox 14. The IPC hardware module 16 detects, via a bus 34, that a message has been written to the high priority mailbox 14 and immediately sends an IRQ message to the second client application 12 running on the second processor 6 via the interrupt bus 32. This IRQ message interrupts the second client application 12 and causes the second processor 6 to retrieve the message from the high priority mailbox 14 and carry out a particular interrupt routine in response to the message. If the second processor 6 is asleep, it will first be woken up.

However, if the message from the first processor 4 is a low priority message, the first processor 4 writes the message to the low priority mailbox 18 and sets a flag in the idle thread 20 (which can be checked by the second processor 6 when it wakes up as described below) that indicates to the second processor 6 that a message is waiting for it. The low priority mailbox 18 accumulates low priority messages until such time as the second processor 6 retrieves them from the low priority mailbox 18. When the second processor 6 wakes up from the low power mode, e.g. at a scheduled time or due to some other interrupt, it checks the idle thread 20 and determines that there is a flag indicating that there is a message or messages waiting for it in the low priority mailbox 18. The second processor 6 then retrieves the message(s) from the low priority mailbox 18 via the bus 28 connecting the second application 12 to the idle thread 20.

As the low priority mailbox 18 is implemented using a buffer of finite length, it is possible for it to become full. If this happens, the IPC hardware module 16 is arranged to send an IRQ message to the second processor 6 via a bus 32. This causes the second processor 6 to wake up and process the messages waiting in the low priority mailbox 18, thus freeing up space for further low priority messages from the first processor 4.

In this embodiment, the second processor 6 has write access only to the high priority mailbox 14 and so when the second processor 6 has a message to send to the first processor 4, it writes the message to the high priority mailbox 14. The IPC hardware module 16 detects the presence of the message via the bus 34 and immediately sends an IRQ message to the first client application 10 running on the first processor 4 via the interrupt bus 30. This IRQ message interrupts the first client application 10 and causes the first processor 4 to retrieve the message from the high priority mailbox 14 and carry out a particular interrupt routine in response to the message.

FIG. 2 is a block diagram of a device 2' with two-way communication where the mailboxes are shared between the processors in accordance with another embodiment of the present invention. The device of FIG. 2 shares many elements with the device of FIG. 1, where like reference numerals indicate like components.

Each processor 4', 6' can be operated in either a normal mode of operation or a low power mode in which it reduces its power consumption, for example by switching off or by going to sleep for a period of time. The processors 4', 6' may be set to sleep and wake up according to a predetermined schedule, or may instead be set to sleep indefinitely until woken up, for example by an interrupt.

The low priority mailbox 18' is shared between the two processors 4', 6', which is facilitated by the provision of some further buses. In addition to the connections described previously with reference to FIG. 1, the low priority mailbox 18' is connected to the second client application 12' by a bus 40'. A further idle thread 21', running on the first processor 4', is connected to the first client application 10' via a data bus 42' and an interrupt bus 44'.

Unlike the device 2 of FIG. 1, the second processor 12' designates any message it has to send to the first processor 4' as a high priority message or a low priority message. If it is a high priority message, the second processor 6' writes the message to the high priority mailbox 14' as described above with reference to FIG. 1. The IPC hardware module 16' detects, via the bus 34', that a message has been written to the high priority mailbox 14' by the second processor 6' and immediately sends an IRQ message to the first client application 10' running on the first processor 4' via the interrupt bus 32'. This IRQ message interrupts the first client application 10' and causes the first processor 4' to retrieve the message from the high priority mailbox 14' and carry out a particular interrupt routine in response to the message.

On the other hand, if the second processor 6' designates the message as a low priority message, the second processor 6' writes the message to the low priority mailbox 18' and sets a flag in the respective idle thread 21' that indicates to the first processor 4' that a message is waiting for it, i.e. there is a flag in each idle thread 21', 20' for indicating to the respective processor 4', 6' that a message is waiting for that processor 4', 6'. Each message stored in the low priority mailbox 18' is provided with an address indicating which processor 4', 6' the message is intended for.

The low priority mailbox 18' accumulates low priority messages intended for both processors 4', 6' until such a time that the respective processor 4', 6' retrieves them from the low priority mailbox 18'. When the respective processor 4', 6' wakes up from the low power mode, e.g. at a scheduled time or due to some other interrupt, it checks its respective idle thread 20', 21' and determines that there is a flag indicating that there is a message or messages waiting for it in the low priority mailbox 18'. The processor 4', 6' then retrieves the message(s) from the low priority mailbox 18' via the respective bus 44', 38' between the processor 4', 6' and the idle thread 20', 21'.

If the low priority mailbox 18' becomes full, the IPC hardware module 16' is arranged to send an IRQ message to one or both of the processors 4', 6' via the respective interrupt busses 32', 30'. This causes the processor 4', 6' (or, where appropriate, both processors 4', 6') to wake up and process the messages waiting in the low priority mailbox 18', thus freeing up space for further low priority messages.

When each processor 4', 6' wakes up (which may happen independently of when the other processor 4', 6' wakes up), it checks the low priority mailbox 18' via its respective idle thread 20', 21' to determine whether the respective flag that indicates a message is waiting for it is set. If the respective flag is set, the processor 4', 6' retrieves any message that is addressed to it residing in the low priority mailbox 18'.

It can be seen that, unlike the device 2 of FIG. 1, the device 2' of FIG. 2 is symmetric—each processor 4', 6' can use both mailboxes 14', 18'.

Figure 3A:
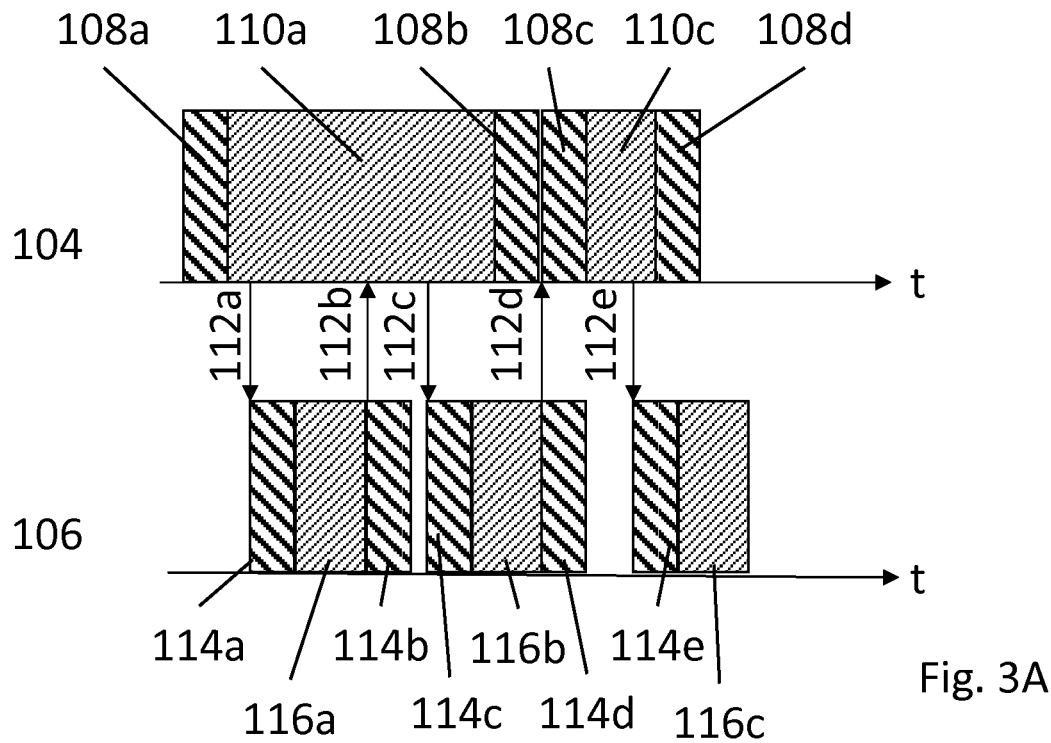
FIGS. 3A and 3B are timing diagrams showing typical operation of the device of FIG. 2.
Figure 3B:
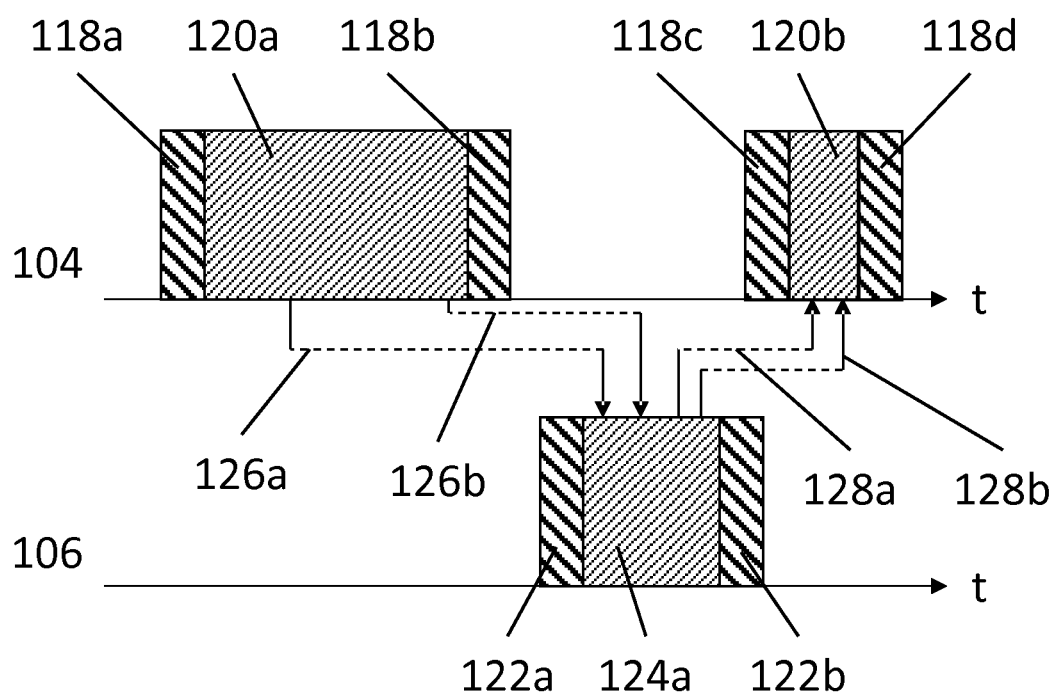

FIGS. 3A and 3B are timing diagrams showing typical operation of the device 2 of FIG. 2. In particular, FIG. 3A shows the activity 104 of the first processor 4' and the activity 106 of the second processor 6', subject to the activity of the high priority mailbox 14'. Conversely, FIG. 3B shows the activity 104 of the first processor 4' and the activity 106 of the second processor 6' subject to the activity of the low priority mailbox 18'.

Firstly, with regard to the activities 104, 106 of the first and second processors 4', 6' subject to the high priority mailbox 14', the first processor 4' is initially in a transition state 108*a* before reaching an active state 110*a*. These 'transition states' represent the time it takes for hardware to enter and exit its respective low power mode, e.g. to turn the associated power and clock sources on or off and to restore hardware states where appropriate.

During its active state 110*a*, the first processor 4' sends a high priority message 112*a* to the second processor 6' via the IPC module 8'. This immediately causes an IRQ message to be sent to the second processor 6' via the bus 32'. As a result, the second processor 6' begins to wake from its low power mode and enters an transition state 114*a* before entering the active state 116*a* in which it retrieves the message from the high priority mailbox 14'.

Later, the second processor 6' sends a high priority message 112*b* to the first processor 4'. As the first processor 4' is already in an active state 110*a*, it does not need to wake up upon receiving the IRQ signal and immediately processes the message in the high priority mailbox 14'.

However, by the time the first processor 4' sends the next high priority message 112c to the second processor 6', the second processor 6' has switched to the low power mode following a transition state 114b. Once the message 112c is placed in the high priority mailbox 14', an IRQ message is sent to the second processor 6' via the interrupt bus 32' and the second processor 6' enters a transition state 114c before entering the active state 116b. The second processor 6' processes the high priority message 112c once it is in the active state 116b.

During this active state 116b, the second processor 6' sends a high priority message 112d to the first processor 4' by placing it in the high priority mailbox 14'. Following a transition state 108b, the first processor 4' had entered its low power mode, however this high priority message 112d gives rise to an IRQ message that wakes the first processor 4' back up, where the first processor 4' enters a further transition state 108c before being in an active state 110c once more. Once in the active state 110c, the first processor 4' processes the high priority message 112d.

Conversely, it can be seen in FIG. 3B that the messages 126a, 126b sent by the first processor 4' to the second processor 6' do not cause the second processor 6' to wake up from the low power mode immediately. Similarly, the messages 128a, 128b sent by the second processor 6' to the first processor 4' do not cause the first processor 4' to immediately wake up from its low power mode either.

Initially, the first processor 4' changes from a transition state 118a to an active state 120a. When in this active state 120a, the first processor 4' sends a low priority message 126a to the second processor 6' by writing it to the low priority mailbox 18'. This does not give rise to an IRQ message and so the second processor 6' is not woken up and remains in the low power mode. Similarly, a second low priority message 126b from the first processor 4' does not wake the second processor 6'. The first processor 4' does not need to remain active 120a after sending the low priority messages 126a, 126b and can return to its low power mode after undergoing a transition 118b once it has sent its low priority messages 126a, 126b.

When the second processor 6' does wake up (e.g. according to a schedule or due to some other interrupt), it enters a transition state 122a and then enters an active state 124a. At this time, the second processor 6' processes the messages 126a, 126b waiting for it in the low priority mailbox 18'. This could happen immediately or after other, scheduled, tasks have been performed.

Similarly, when messages 128a, 128b are sent from the second processor 6' to the first processor 4' while the second processor 6' is in the active state 124a, these messages 128a, 128b do not cause the first processor 4' to wake from its low power mode. Instead, the first processor 4' waits until it wakes up and is in its next active state 120b (following a transition state 118c) before retrieving the low priority messages 128a, 128b from the low priority mailbox 18'. The first processor 4' may then return to its low power mode after undergoing a further transition state 118d. The second processor 6' does not need to remain active 124a after sending the low priority messages 128a, 128b and can return to its low power mode after undergoing a transition 122b once it has sent its low priority messages 128a, 128b.

Figure 4:
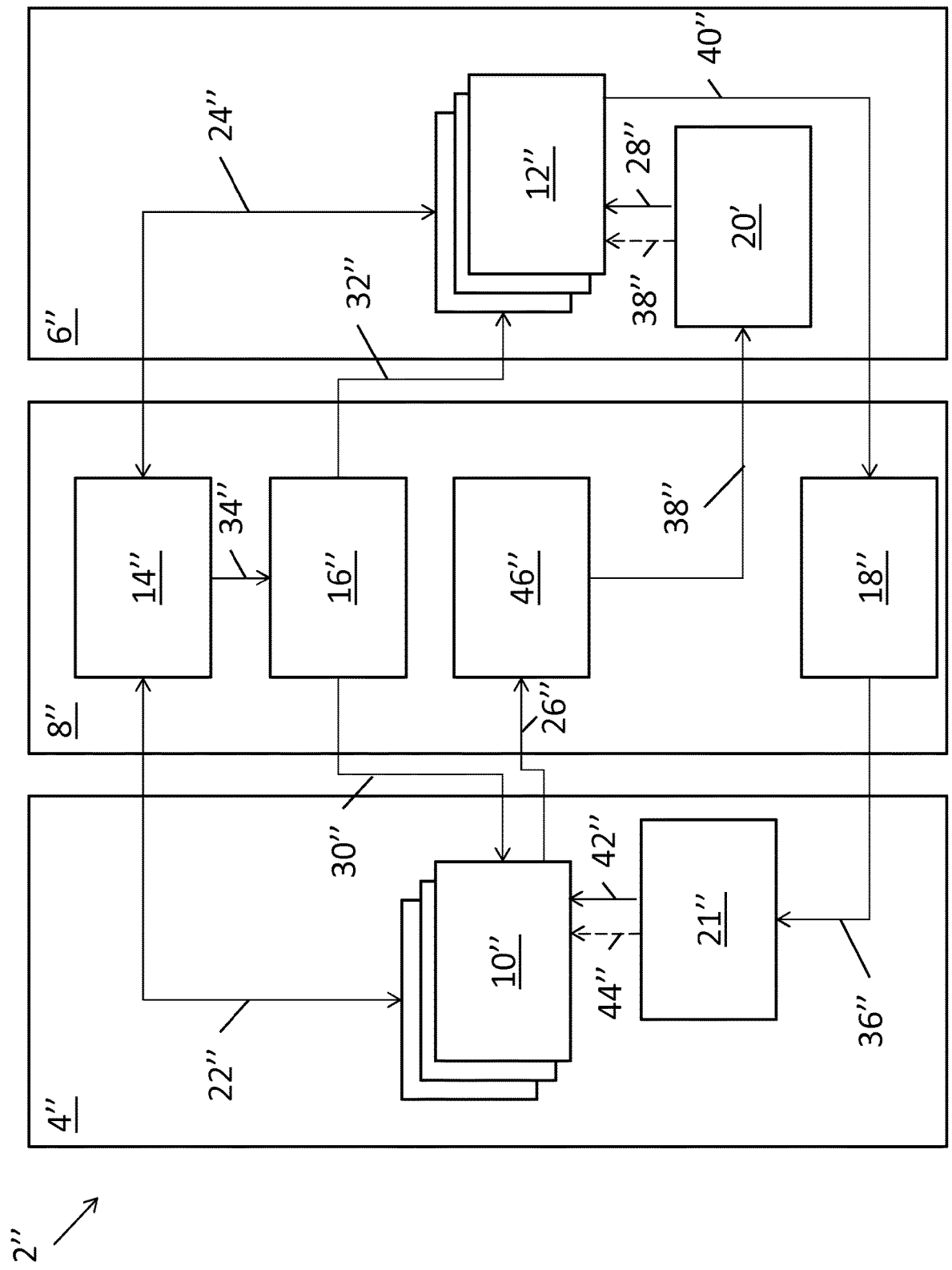
FIG. 4 is a block diagram of a device with two-way communication where the processors have separate low priority mailboxes in accordance with another embodiment of the present invention.

FIG. 4 is a block diagram of a device with two-way communication where the processors have separate low priority mailboxes in accordance with another embodiment of the present invention. The device of FIG. 2 shares many elements with the devices of FIGS. 1 and 2, where like reference numerals indicate like components.

Like the device 2' described above with reference to FIG. 2, the device 2" of FIG. 4 provides two-way communication such that each processor 4", 6" can send messages to the other processor 4", 6". However, unlike the device 2' of FIG. 3, the device 2" of FIG. 4 provides separate low priority mailboxes 18", 46" for each of the processors 4", 6" to send low priority messages to.

When the first processor 4" has a high priority message to send to the second processor 6", it writes the message to the high priority mailbox 14". Likewise, when the second processor 6" has a high priority message to send to the second processor 6", it writes the message to the same high priority mailbox 14". In other words, in this embodiment, the high priority mailbox 14" is shared between the two processors 4", 6".

The IPC hardware module 16" detects, via the bus 34", that a message has been written to the high priority mailbox 14" by one of the processors 4", 6" and immediately sends an IRQ message to the client application 10", 12" running on the other processor 4", 6" via the respective interrupt bus 30", 32". This IRQ message interrupts the respective client application 10", 12" and causes the respective processor 4", 6" to retrieve the message from the high priority mailbox 14" and carry out a particular interrupt routine in response to the message.

If, however, the first processor 4" has a low priority message to send to the second processor 6", the first processor 4" writes the message to the first low priority mailbox 18" and sets a flag to be checked by the idle thread 20" that indicates to the second processor 6" that a message is waiting for it. The first low priority mailbox 18" accumulates low priority messages until such a time that the second processor 6" retrieves them from the first low priority mailbox 18". When the second processor 6" wakes up from the low power mode, e.g. at a scheduled time or due to some other interrupt, it checks the idle thread 20" and determines that there is a flag indicating that there is a message or messages waiting for it in the first low priority mailbox 18". The second processor 6" then retrieves the message(s) from the first low priority mailbox 18" via the bus 48" between the second client application 12" and the first low priority mailbox 18".

Conversely, when the second processor 6" has a low priority message to send to the first processor 4", the second processor 6" writes the message to the second low priority mailbox 46" and sets a flag to be checked by the idle thread 21" that indicates to the first processor 4" that a message is waiting for it. The second low priority mailbox 46" accumulates low priority messages until such a time that the first processor 4" retrieves them from the second low priority mailbox 46". When the first processor 4" wakes up from its low power mode, it checks the idle thread 21" and determines that there is a flag indicating that there is a message or messages waiting for it in the second low priority mailbox 46". The first processor 4" then retrieves the message(s) from the second low priority mailbox 46" via the bus 50" between the first client application 10" and the second low priority mailbox 46".

If the first low priority mailbox 18" becomes full, the second processor 6" is sent an IRQ message via the interrupt bus 32" between the second processor 6" and the IPC hardware module 16". Similarly, if the second low priority mailbox 46" becomes full, the first processor 4" is sent an IRQ message via the interrupt bus 30" between the first processor 4" and the IPC hardware module 16".

Thus it will be appreciated by those skilled in the art that embodiments of the present invention provide an improved electronic device and method of operating the same where only high priority messages cause the second processor to be interrupted, while low priority messages are placed into a separate mailbox to the high priority messages and do not give rise to an interrupt, which may result in a reduction of the power consumption of the device. It will be appreciated by those skilled in the art that the embodiments described above are merely exemplary and are not limiting on the scope of the invention.

The invention claimed is:

1. An electronic device comprising:
   at least first and second processors; and
   an inter-processor communication module connected to said first and second processors, said inter-processor communication module comprising a first mailbox and a second mailbox;
   wherein the first processor is arranged to send a message to the second processor, said message being either a high priority message or a low priority message;
   wherein the second processor is operable in a normal power mode of operation and a low power mode of operation in which one or more functions of the second processor are disabled; and
   wherein the first processor is further arranged such that:
   when the first processor has a high priority message to send to the second processor, the first processor places the high priority message in the first mailbox and sends an interrupt request to the second processor; and
   when the first processor has a low priority message to send to the second processor, the first processor places the low priority message in the second mailbox, does not send an interrupt request to the second processor; and sets a low priority message waiting flag;
   wherein the second processor is arranged to check whether the low priority message waiting flag is set or to check the second mailbox after switching from the low power mode to the normal power mode; and
   wherein the inter-processor communication module is arranged to set a mailbox full flag when the number of messages contained in the second mailbox exceeds a threshold value, wherein setting the mailbox full flag sends an interrupt request to the second processor.

2. The electronic device as claimed in claim 1, wherein the second mailbox comprises a buffer.

3. The electronic device as claimed in claim 1, wherein the second processor checks whether the low priority message waiting flag is set, and retrieves the low priority message from the second mailbox only when the low priority message waiting flag is set.

4. The electronic device as claimed in claim 3, wherein the second processor clears the low priority message waiting flag once it has retrieved the low priority message.

5. The electronic device as claimed in claim 1, wherein the second processor is arranged to carry out one or more processing tasks before checking whether the low priority message waiting flag is set or checking the second mailbox when switching from the low power mode to the normal power mode.

6. The electronic device as claimed in claim 1, wherein the second processor is arranged to check whether the low priority message waiting flag is set or to check the second mailbox as part of an idle operating system task.

7. The electronic device as claimed in claim 1, wherein the second processor is arranged to call a receive function, wherein calling said receive function blocks a thread on the second processor until an idle thread generates a signal indicating that the low priority message should be delivered to the second processor.

8. The electronic device as claimed in claim 1, wherein an idle thread is arranged to call a receive function, wherein the second mailbox is arranged to generate a signal that indicates to the idle thread that the low priority message should be delivered to the second processor.

9. The electronic device as claimed in claim 1, wherein the second processor is arranged to send a message to the first processor.

10. The electronic device as claimed in claim 9, wherein the message sent from the second processor to the first processor is either a high priority message or a low priority message;
    wherein the second processor is further arranged such that:
    when the second processor has a high priority message to send to the first processor, the second processor places the high priority message in the first mailbox and sends an interrupt request to the first processor; and
    when the second processor has a low priority message to send to the first processor, the second processor places the high priority message in the second mailbox and does not send an interrupt request to the first processor.

11. The electronic device as claimed in claim 9, wherein multiple message waiting flags are used such that there is a separate message waiting flag to indicate that one or more messages await each respective processor and the messages are provided with a destination address such that each processor checks its respective message waiting flag to determine whether any messages are waiting for said processor and, if so, said processor is arranged to retrieve the correct message by checking which of the messages are addressed to said processor.

12. The electronic device as claimed in claim 9, wherein the inter-processor communication module comprises a third mailbox and the second processor is further arranged such that when the second processor has a high priority message to send to the first processor, the second processor places the high priority message in the third mailbox and sends an interrupt request to the first processor.

13. The electronic device as claimed in claim 9, wherein the inter-processor communication module comprises a fourth mailbox and the second processor is further arranged such that when the second processor has a low priority message to send to the first processor, the second processor places the high priority message in the fourth mailbox and does not send an interrupt request to the first processor.

14. The electronic device as claimed in claim 1, comprising at least one further processor connected to the inter-processor communication module.

15. A method of operating an electronic device comprising at least first and second processors and an inter-processor communication module connected to said first and second processors, wherein the second processor is operable in a normal power mode of operation and a low power mode of operation in which one or more functions of the second processor are disabled, said inter-processor communication module comprising a first mailbox and a second mailbox, wherein the method comprises:
    determining when the first processor has a message to send to the second processor, wherein said message is a high priority message or a low priority message;
    when the first processor has a high priority message to send to the second processor, placing the high priority message in the first mailbox and sending an interrupt request to the second processor; and when the first processor has a low priority message to send to the second processor, placing the low priority message in the second mailbox, not sending an interrupt request to the second processor, and setting a low priority message waiting flag;

the second processor checking whether the low priority message waiting flag is set or checking the second mailbox after switching from the low power mode to the normal power mode; and the inter-processor communication module setting a mailbox full flag when the number of messages contained in the second mailbox exceeds a threshold value, wherein setting the mailbox full flag sends an interrupt request to the second processor.

16. A non-transitory computer-readable medium that, when executed on a first processor, causes the first processor to execute a method of communicating with a second processor, wherein the second processor is operable in a normal power mode of operation and a low power mode of operation in which one or more functions of the second processor are disabled, wherein the method comprises:

determining when the first processor has a message to send to the second processor, wherein said message is a high priority message or a low priority message;

when the first processor has a high priority message to send to the second processor, placing the high priority message in a first mailbox within an inter-processor communication module connected to said first and second processors, and sending an interrupt request to the second processor; and when the first processor has a low priority message to send to the second processor, placing the low priority message in a second mailbox within the inter-processor communication module, not sending an interrupt request to the second processor, and setting a low priority message waiting flag;

the second processor checking whether the low priority message waiting flag is set or checking the second mailbox after switching from the low power mode to the normal power mode; and wherein the inter-processor communication module setting a mailbox full flag when the number of messages contained in the second mailbox exceeds a threshold value, wherein setting the mailbox full flag sends an interrupt request to the second processor.

* * * * *